US010007699B2

(12) United States Patent
Pangeni et al.

(10) Patent No.: US 10,007,699 B2
(45) Date of Patent: Jun. 26, 2018

(54) OPTIMIZED EXCLUSION FILTERS FOR MULTISTAGE FILTER PROCESSING IN QUERIES

(71) Applicants: Sushil Pangeni, Kathmandu (NP); Chakkaravarthy Periyasamy Balaiah, San Jose, CA (US); Abhishek Bathla, Panipat (IN)

(72) Inventors: Sushil Pangeni, Kathmandu (NP); Chakkaravarthy Periyasamy Balaiah, San Jose, CA (US); Abhishek Bathla, Panipat (IN)

(73) Assignee: Zscaler, Inc., San Jose, CA (US)

( * ) Notice: Subject to any disclaimer, the term of this patent is extended or adjusted under 35 U.S.C. 154(b) by 453 days.

(21) Appl. No.: 14/681,282

(22) Filed: Apr. 8, 2015

(65) Prior Publication Data

US 2016/0299947 A1    Oct. 13, 2016

(51) Int. Cl.
*G06F 17/30* (2006.01)
*G06F 17/00* (2006.01)

(52) U.S. Cl.
CPC .. *G06F 17/30454* (2013.01); *G06F 17/30469* (2013.01)

(58) Field of Classification Search
CPC ........ G06F 17/30424; G06F 17/30592; G06F 17/30463; G06F 17/30315; G06F 17/30339; G06F 17/30486; G06F 17/30289; G06F 17/30312; G06F 17/30584; G06F 17/30466; G06F 17/30516; G06F 17/30498; G06F 17/30292; G06F 17/30309; G06F 17/30477; G06F 17/30569; G06F 17/30646; G06F 17/30867; G06F 17/30917; G06F 17/30923; G06F 17/30165; G06F 17/30303; G06F 17/3033; G06F 17/30336; G06F 17/30442; G06F 17/30445; G06F 17/30448; G06F 17/30454; G06F 17/30575; G06F 17/30598; G06F 2221/0753; G06F 9/5066; G06F 9/5088; G06F 11/1451; G06F 11/36; G06F 12/023; G06F 17/30241; G06F 17/30321; G06F 17/30371; G06F 17/30474; G06F 17/30507; G06F 17/30528; G06F 17/3053; G06F 17/30699; G06F 2201/84; G06F 2212/1044
See application file for complete search history.

(56) References Cited

U.S. PATENT DOCUMENTS

2008/0183674 A1* 7/2008 Bush ................. G06F 17/30923
2013/0282650 A1* 10/2013 Zhang ............... G06F 17/30592
                                                                707/605
2015/0026165 A1* 1/2015 Louie ................ G06F 17/30699
                                                                707/723

* cited by examiner

*Primary Examiner* — Yicun Wu
(74) *Attorney, Agent, or Firm* — Clements Bernard Walker PLLC; Lawrence A. Baratta, Jr.

(57) ABSTRACT

A computer-implemented method for querying a data source using an optimized exclusion filter expression created from a full filter expression is described. The method includes receiving one or more queries defined by the full filter expression, wherein the one or more queries are for obtaining an output from the data source; performing a reduction on the full filter expression to determine the optimized exclusion filter expression; applying the optimized exclusion filter expression in the data source to exclude data; and applying the full filter expression to data not excluded by the optimized exclusion filter expression.

12 Claims, 10 Drawing Sheets

OPTIMIZED EXCLUSION FILTERS FOR MULTISTAGE FILTER PROCESSING IN QUERIES

FIELD OF THE DISCLOSURE

The present disclosure relates generally to computer systems and methods. More particularly, the present disclosure relates to optimized exclusion filters for multistage filter processing in queries.

BACKGROUND OF THE DISCLOSURE

As computing technology evolves, data collection and analysis have proliferated. The amount of data collected has risen exponentially, but processing ability has not kept pace. With the vast amount of collected data, in one or more data sources, the ability for conventional systems to efficiently query the data sources can be resource intensive and costly. A query of or more data sources is a precise request for information retrieval. Filtering is one of the fundamental operations that is carried out during query processing. A given query can specify any arbitrary filter expression for application on the data sources. Some of the predicates in the filter expression could be more expensive than others in terms of system resource utilization, time, etc. For example, a predicate that does a regular expression (regex) search (e.g. name like "john %") over data would be much more resource intensive than a predicate that does a numeric equivalency check (e.g. income>=10000).

In some cases, there may be a need to carry out multiple passes over the same data set for answering different queries. In such cases, performance can be improved by doing a single pass over the dataset and handing over the data to multiple execution engines. This model of single source and multiple consumers also works well where pulling data out of the source is very expensive. This could be a disk or tape or any other slower media. It can even be a fast medium which is behind a slower network pipe.

In cases where parallel queries are being processed for a same data set, it can be very challenging to apply filters in the most optimized way. The most naïve method is to let each query processor apply the filters independently. The major disadvantage of such a technique is that each query processor has to apply filter set on the complete data set, and, in some cases, where there may be common filters, it gets evaluated multiple times.

BRIEF SUMMARY OF THE DISCLOSURE

In an exemplary embodiment, a computer-implemented method for querying a data source using an optimized exclusion filter expression created from a full filter expression includes receiving one or more queries defined by the full filter expression, wherein the one or more queries are for obtaining an output from the data source; performing a reduction on the full filter expression to determine the optimized exclusion filter expression; applying the optimized exclusion filter expression in the data source to exclude data; and applying the full filter expression to data not excluded by the optimized exclusion filter expression. If a result of the optimized exclusion filter expression is FALSE, then the full filter expression also yields a result of FALSE; and if the result of the optimized exclusion filter expression is TRUE, then the full filter expression does not have a definitive result and must be evaluated. The one or more queries can include two separate queries that are combined in a same optimized exclusion filter expression for the applying the optimized exclusion filter, and evaluated separately for the applying the full filter expression. The full filter expression and the optimized exclusion filter expression are each a combination of predicates and logical operators comprising AND, OR, and NOT, each of the predicates is an expression that evaluates to TRUE or FALSE, and each of the predicates has an associated cost which is used in the reduction. The reduction can include a combination of expanding NOT expressions, setting high cost predicates to TRUE, and adjusting an associated expression tree based thereon. The data source can include a plurality of physically separate databases, and the optimized exclusion filter expression can be determined for each individual separate database. The reduction can be performed iteratively by reducing threshold costs to remove more predicates and reduce the overall cost, to determine a minimization of the optimized exclusion filter expression. The associated expression tree can be adjusted by modifying nodes where the high cost predicates are set to TRUE.

In another exemplary embodiment, a system configured to query a data source using an optimized exclusion filter expression created from a full filter expression includes a network interface, the data store, and a processor, each communicatively coupled to one another; and memory storing instructions that, when executed, cause the processor to: receive one or more queries defined by the full filter expression, wherein the one or more queries are for obtaining an output from the data source; perform a reduction on the full filter expression to determine the optimized exclusion filter expression; apply the optimized exclusion filter expression in the data source to exclude data; and apply the full filter expression to data not excluded by the optimized exclusion filter expression. If a result of the optimized exclusion filter expression is FALSE, then the full filter expression also yields a result of FALSE; and if the result of the optimized exclusion filter expression is TRUE, then the full filter expression does not have a definitive result and must be evaluated. The one or more queries can include two separate queries that are combined in a same optimized exclusion filter expression to apply the optimized exclusion filter, and evaluated separately to apply the full filter expression. The full filter expression and the optimized exclusion filter expression are each a combination of predicates and logical operators comprising AND, OR, and NOT, each of the predicates is an expression that evaluates to TRUE or FALSE, and each of the predicates has an associated cost which is used in the reduction. The reduction can include a combination of expanding NOT expressions, setting high cost predicates to TRUE, and adjusting an associated expression tree based thereon. The data source can include a plurality of physically separate databases, and the optimized exclusion filter expression can be determined for each individual separate database. The reduction can be performed iteratively by reducing threshold costs to remove more predicates and reduce the overall cost, to determine a minimization of the optimized exclusion filter expression. The associated expression tree can be adjusted by modifying nodes where the high cost predicates are set to TRUE.

In a further exemplary embodiment, software stored in a non-transitory computer readable medium with instructions executable by a processor is configured to perform operations including receiving one or more queries defined by the full filter expression, wherein the one or more queries are for obtaining an output from the data source; performing a reduction on the full filter expression to determine the optimized exclusion filter expression; applying the optimized exclusion filter expression in the data source to exclude data; and applying the full filter expression to data not excluded by the optimized exclusion filter expression. If a result of the optimized exclusion filter expression is FALSE, then the full filter expression also yields a result of FALSE; and if the result of the optimized exclusion filter expression is TRUE, then the full filter expression does not have a definitive result and must be evaluated. The one or more queries can include two separate queries that are combined in a same optimized exclusion filter expression for the applying the optimized exclusion filter, and evaluated separately for the applying the full filter expression. The full filter expression and the optimized exclusion filter expression are each a combination of predicates and logical operators comprising AND, OR, and NOT, each of the predicates is an expression that evaluates to TRUE or FALSE, and each of the predicates has an associated cost which is used in the reduction.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, optimized exclusion filter systems and methods are described for multistage filter processing in queries. The systems and methods include creating an optimized exclusion filter expression from single or multiple filter expressions for a given data source. The optimized exclusion filter is economical in terms of speed and resource utilization, and the optimized exclusion filter is used to perform an initial pass on the data source for exclusion of results. That is, if the result of the optimized exclusion filter expression is FALSE, then the final result is also FALSE and the data can be safely excluded, and no further filtering is required. If the result is TRUE, then the final result is not definitive and the full filter expressions need to be applied. Thus the initial pass is performed with the optimized exclusion filter in less resource intensive manner than the full filter expressions, and the full filter expressions only are required on the non-excluded data from the optimized exclusion filter.

Beneficially, the systems and methods reduce the amount of data processed by query processing modules. For query systems where the storage layer is separate from the execution layer, filtering can be offloaded to the storage layer whenever possible. This reduces the cost of data movement from the storage layer to the execution layer. For parallel query systems, the amount of data generated by the storage layer can be reduced, and also the amount of duplicate evaluation of conditional expression can be reduced wherever possible. JOIN queries can be optimized further by reducing the number of reads that needs to be done on the secondary tables. Filtering can be applied at source level only on the primary table using the optimized exclusion filter expression.

Query Processing System

Figure 1:
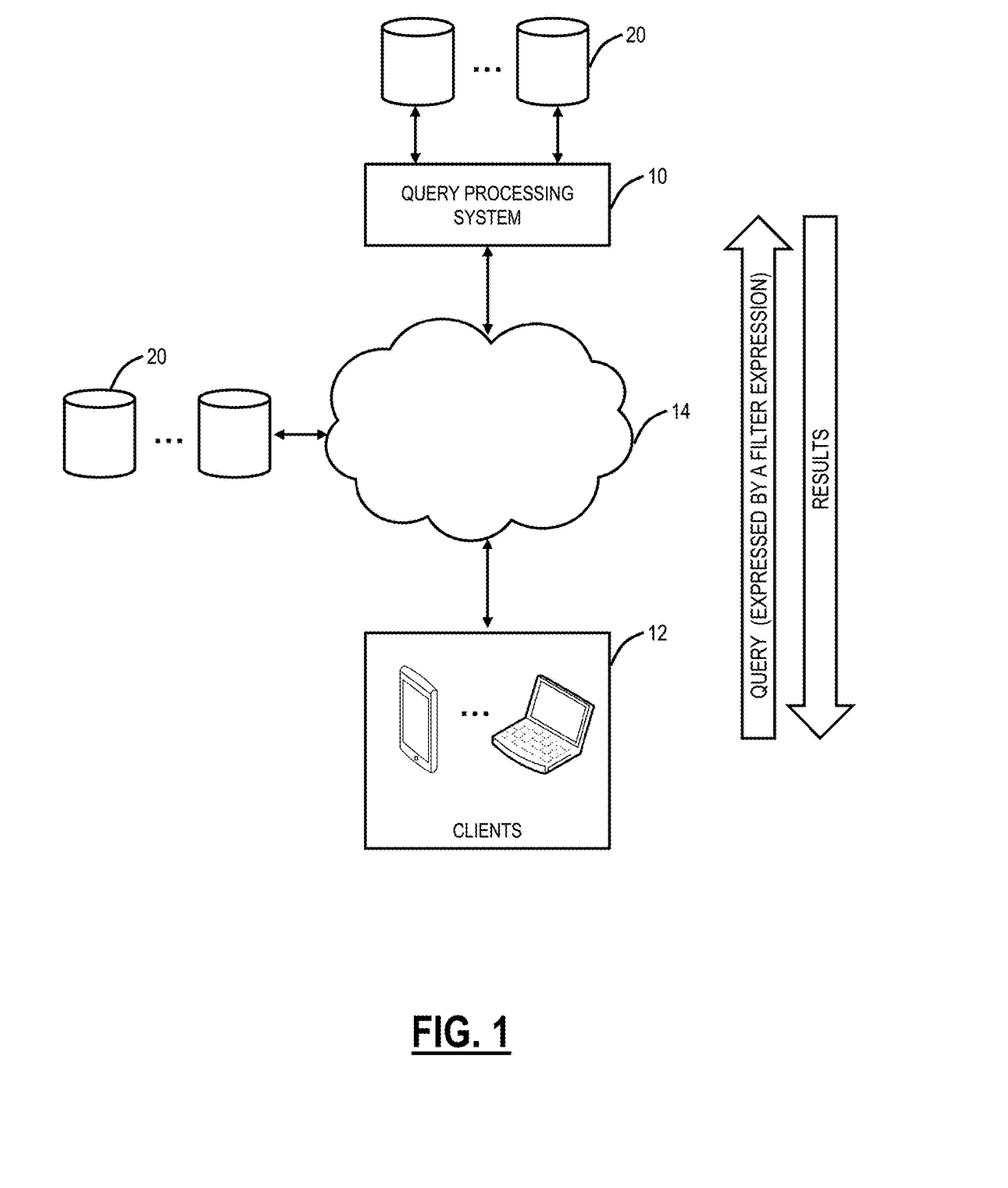
FIG. 1 is a network diagram of a query processing system for implementing the optimized exclusion filter systems and methods for multistage filter processing in queries.

Referring to FIG. 1, in an exemplary embodiment, a network diagram illustrates a query processing system 10 for implementing the optimized exclusion filter systems and methods for multistage filter processing in queries. The query processing system 10 is communicatively coupled to one or more clients 12 through a network 14. For example, the clients 12 can be computers (laptops, desktops, etc.), mobile devices (tablets, smart phones, etc.), and the like. The network 14 can be the Internet, a Wide Area Network (WAN), a Local Area Network (LAN), as well as combinations thereof. The query processing system 10 is communicatively coupled to one or more databases 20, such as through local connections and/or the network 14. The one or more databases 20 store data sets—in one or more files. The data sets are a collection of data. The function of the query processing system 10 is to receive queries from the clients 12 and to interact with the databases 20 to respond to the queries with associated results. Each query is a precise request for information retrieval in the data sets, expressed by a filter expression. The data sets can be characterized as big data—that is, the data sets are large and conventional queries can be resource intensive. In an exemplary embodiment, the data sets can be indexed by time and include network activity of a plurality of users (i.e., thousands to millions of users). Of course, other types of data are also contemplated for the data sets.

In various exemplary embodiments, the systems and methods provide optimization in the query processing system 10. Specifically, the query processing system 10 takes the filter expression and attempts to minimize its cost (in terms of resource utilization) to form an optimized exclusion filter expression. The databases 20 are initially queried with the optimized exclusion filter expression to reduce a size of the data sets. This initial query is less resource intensive than a full query with the non-reduced filter expression, and an output of this initial query will be a significantly reduced size data set. The non-reduced filter expression can then be applied to the significantly reduced size data set, yielding the results. Note, breaking down the processing into multiple steps yields significant performance improvements since the optimized exclusion filter expression is minimized in terms of resource cost. Thus, the minimum resource cost expression (optimized exclusion filter expression) is applied to the entire data set, and the maximum resource cost expression (non-reduced filter expression).

Figure 2:
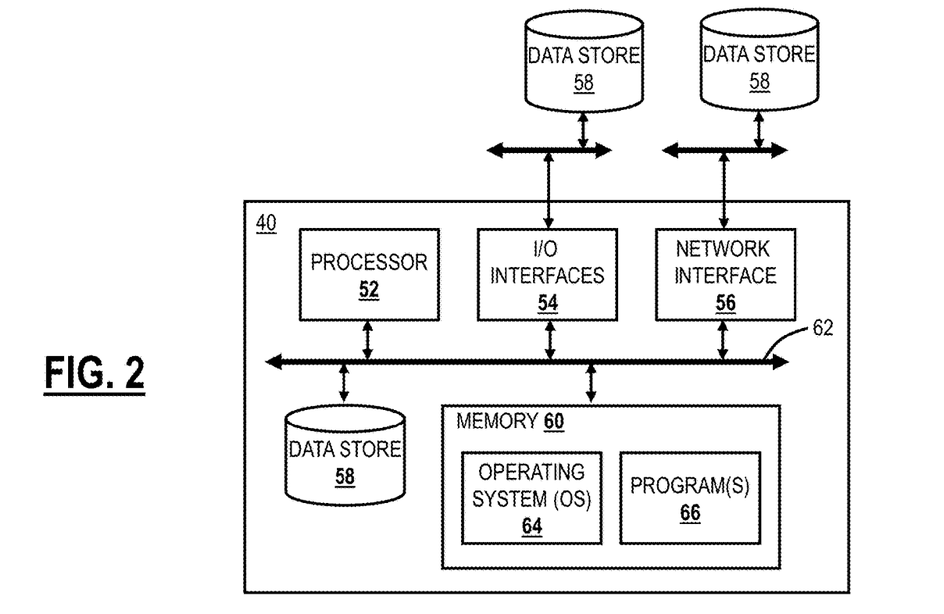
FIG. 2 is a block diagram of a server which may be used for a data system to perform the various systems and methods described herein.

From a physical perspective, the query processing system 10 can be physically implemented in one or more servers, such as described in FIG. 2. Alternatively, the query processing system 10 can be implemented in a cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud."

Exemplary Server for the Query Processing System

Referring to FIG. 2, in an exemplary embodiment, a block diagram illustrates a server 40 which may be used to realize the query processing system 10. The server 40 may be a digital computer that, in terms of hardware architecture, generally includes a processor 52, input/output (I/O) interfaces 54, a network interface 56, a data store 58, and memory 60. It should be appreciated by those of ordinary skill in the art that FIG. 2 depicts the server 40 in an oversimplified manner, and a practical embodiment may include additional components and suitably configured processing logic to support known or conventional operating features that are not described in detail herein. The components (52, 54, 56, 58, and 60) are communicatively coupled via a local interface 62. The local interface 62 may be, for example but not limited to, one or more buses or other wired or wireless connections, as is known in the art. The local interface 62 may have additional elements, which are omitted for simplicity, such as controllers, buffers (caches), drivers, repeaters, and receivers, among many others, to enable communications. Further, the local interface 62 may include address, control, and/or data connections to enable appropriate communications among the aforementioned components.

The processor 52 is a hardware device for executing software instructions. The processor 52 may be any custom made or commercially available processor, a central processing unit (CPU), an auxiliary processor among several processors associated with the server 40, a semiconductor-based microprocessor (in the form of a microchip or chip set), or generally any device for executing software instructions. When the server 40 is in operation, the processor 52 is configured to execute software stored within the memory 60, to communicate data to and from the memory 60, and to generally control operations of the server 40 pursuant to the software instructions. The I/O interfaces 54 may be used to receive user input from and/or for providing system output to one or more devices or components. User input may be provided via, for example, a keyboard, touch pad, and/or a mouse. System output may be provided via a display device and a printer (not shown). I/O interfaces 54 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 56 may be used to enable the server 40 to communicate on a network, such as the Internet, a wide area network (WAN), a local area network (LAN), and the like, etc. The network interface 56 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 56 may include address, control, and/or data connections to enable appropriate communications on the network. A data store 58 may be used to store data. The data store 58 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 58 may incorporate electronic, magnetic, optical, and/or other types of storage media. In one example, the data store 58 may be located internal to the server 40 such as, for example, an internal hard drive connected to the local interface 62 in the server 40. Additionally in another embodiment, the data store 58 may be located external to the server 40 such as, for example, an external hard drive connected to the I/O interfaces 54 (e.g., SCSI or USB connection). In a further embodiment, the data store 58 may be connected to the server 40 through a network, such as, for example, a network attached file server. The data store 58 can include the databases 20 with the associated data sets. Note, FIG. 2 shows the data store 58 both local to the server 40 as well as remote, similar to the database 20 and the query processing system 10 in FIG. 1.

The memory 60 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 60 may incorporate electronic, magnetic, optical, and/or other types of storage media. Note that the memory 60 may have a distributed architecture, where various components are situated remotely from one another, but can be accessed by the processor 52. The software in memory 60 may include one or more software programs, each of which includes an ordered listing of executable instructions for implementing logical functions. The software in the memory 60 includes a suitable operating system (O/S) 64 and one or more programs 66. The operating system 64 essentially controls the execution of other computer programs, such as the one or more programs 66, and provides scheduling, input-output control, file and data management, memory management, and communication control and related services. The one or more programs 66 may be configured to implement the various processes, algorithms, methods, techniques, etc. described herein.

With respect to the query processing system 10, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Optimized Exclusion Filter Processes

Figure 3:
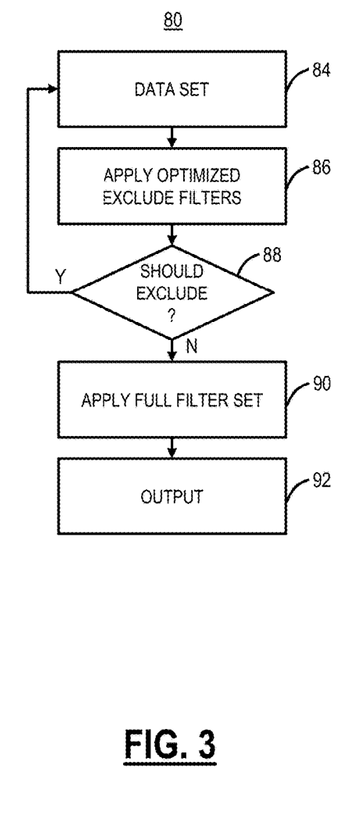
FIGS. 3 and 4 are flow charts of optimized exclusion filter processes.
Figure 4:
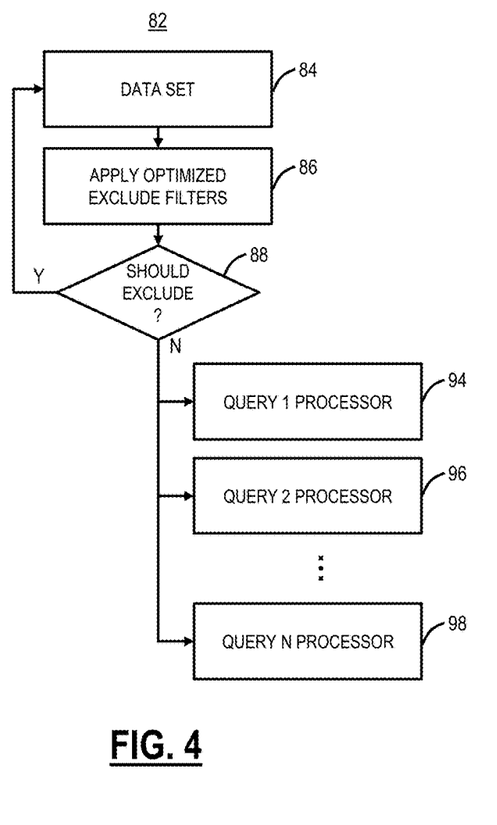

Referring to FIGS. 3 and 4, in exemplary embodiments, flow charts illustrate optimized exclusion filter processes 80, 82. The optimized exclusion filter process 80 (FIG. 3) illustrates a single query, and the optimized exclusion filter process 82 (FIG. 4) illustrates multiple, parallel queries. The optimized exclusion filter processes 80, 82 operate on a query expression for a dataset (step 84) by applying optimized exclude filters on the data set based on the query expression (step 86) to determine whether or not to exclude data in the data set (step 88). For data that is not excluded from the data set (step 88), the optimized exclusion filter process 80 applies the query expression (without optimization) as a full filter set on the data that is not excluded from the dataset (step 90) with the results being an output (step 92). For data that is not excluded from the dataset (step 88), the optimized exclusion filter process 82 applies the query expression (without optimization) on separate query processors (steps 94, 96, 98).

Again, the optimized exclude filters are optimized exclusion filter expressions from a single or multiple filter expressions related to the query. If the result of the optimized exclusion filter expression is FALSE, then the final result is also FALSE and the data can be safely excluded and no further filtering is required. If the result is TRUE, then the final result is not definitive and the full filter sets need to be applied. Using this optimized exclusion filters, the optimized exclusion filter processes 80, 82 can exclude as much data as possible before the complete filter set is applied. In case of parallel queries, the data exclusion is carried out even before it is handed over to the individual query processor in the optimized exclusion filter process 82. The case of the parallel queries is where more than one query is combined to share the optimized exclude filters, to further optimize the query process. Subsequently, the data that are not excluded from the data set is then processed separately with the separate query processors (steps 94, 96, 98).

The optimized exclusion filter processes 80, 82 can use caching during the step 86 to avoid filter re-evaluation. For all data that is not excluded after applying the exclusion filter expression, the full filter expression needs to be applied. This can introduce re-evaluation of some predicates which were already evaluated during the application of exclusion filter. The re-evaluation can be avoided the results of the predicates evaluated during the exclusion stage are cached and re-use them during the final evaluation. In case of parallel query processing, caching could reduce the number of predicates evaluated if the same predicates are present in multiple queries.

Optimized Filter Expression

Figure 5:
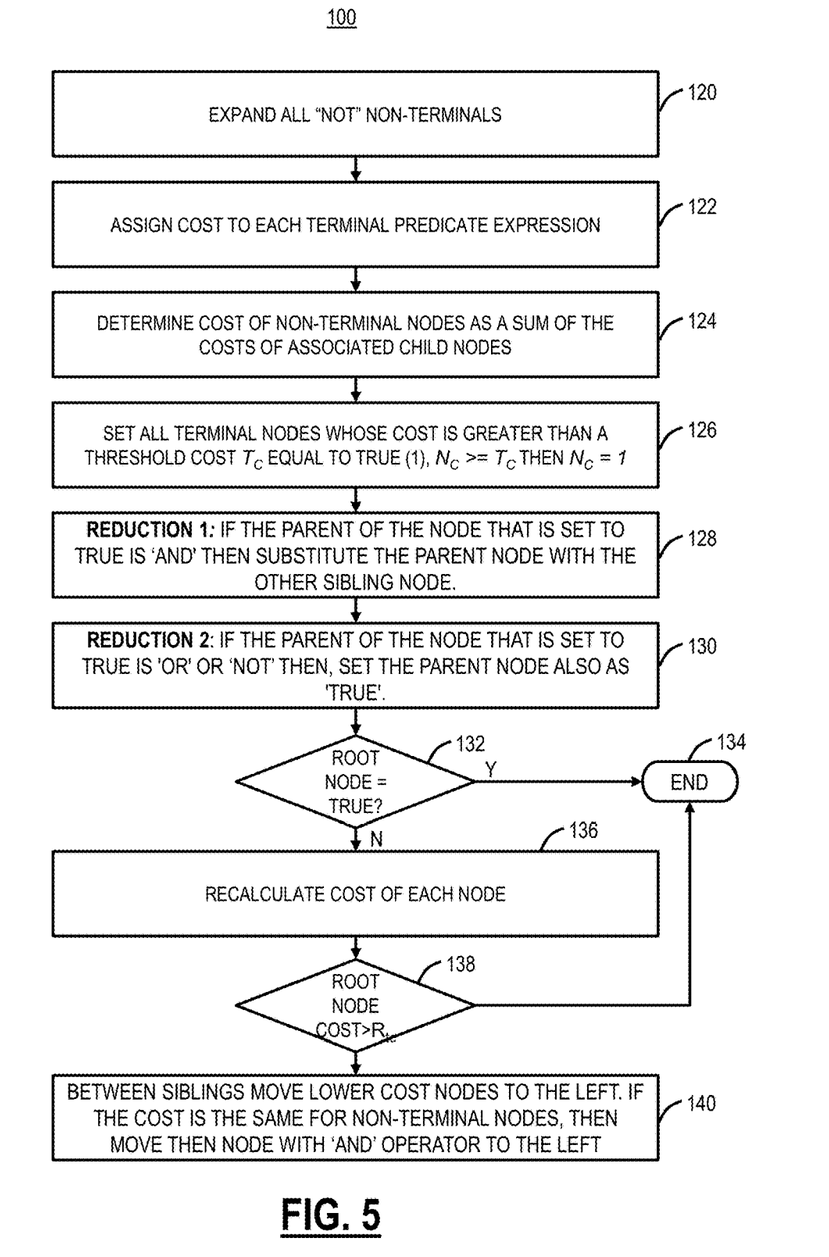
FIG. 5 is a flow chart of an optimized filter expression process.

Referring to FIG. 5, in an exemplary embodiment, a flow chart illustrates an optimized filter expression process 100. Again, the optimized filter expression process 100 describes a method for creating an optimized exclusion filter expression from a single or multiple filter expressions. A predicate can be any expression that evaluates to TRUE or FALSE. Predicates can have different costs in terms of system resource utilization. A filter expression contains predicates combined by logical operators AND ($\wedge$), OR ($\vee$), and/or NOT ($\neg$). The optimized filter expression process 100 requires giving a cost to each predicate and then forming a minimalistic expression based on the cost. The optimized filter expression process 100 also takes advantage of some basic Boolean properties specified below:

1. $x \wedge 1 = x$ (x and 1=x)
2. $x \vee 1 = 1$ (x or 1=1)
3. $\neg(x \wedge y) = (\neg x) \vee (\neg y)$ (not (x and y)=(not x) or (not y))
4. $\neg(x \vee y) = (\neg x) \wedge (\neg y)$ (not (x or y)=(not x) and (not y))

The following terms are used herein:

| | |
|---|---|
| Expression Tree | The binary tree for a given expression (generally formed as result of parsing). |
| Terminal Node | The node that represents elementary predicates in the expression tree. |
| Sibling Nodes | The nodes that share the same parents in the expression tree. |
| Non-terminal Nodes | The node that represents logical operation |
| $N_c$ | For a terminal node, this is the cost of evaluating the elementary predicate represented by that node. For a non-terminal node, this is the cost associated with evaluating the complete expression sub-tree rooted at the non-terminal. |
| P | Predicate - An expression that evaluates to TRUE or FALSE |
| $T_c$ | The threshold cost. |
| $R_{tc}$ | The threshold cost of the Root node; Generally is a multiple of $T_c$ |

The following is an example of a filter expression—field1=10 and (field2>=100 or field2 in (1,2,3,4)) and field3 like "Sam %" and ! (field3="Sam smith" or field4=123).

Figure 6:
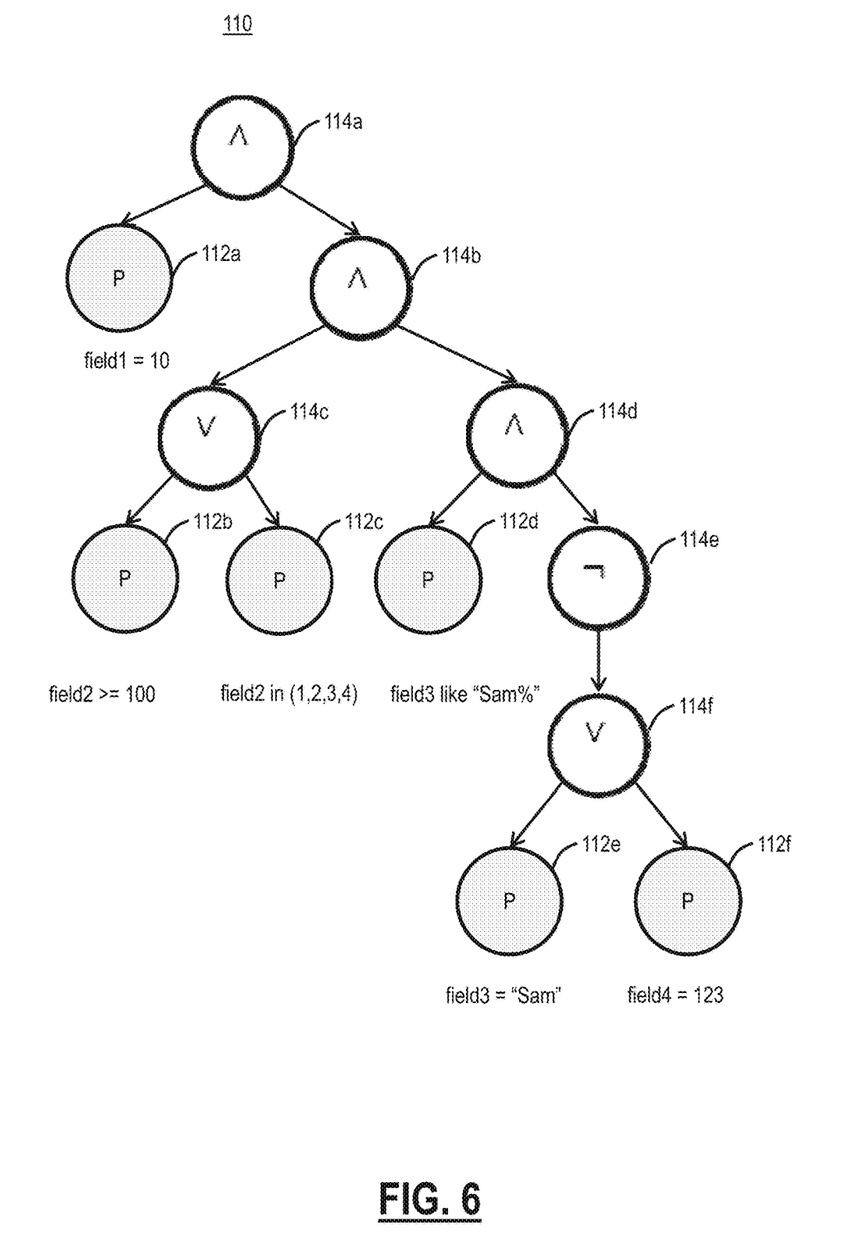
FIG. 6 is an expression tree of an exemplary filter expression.
Figure 7:
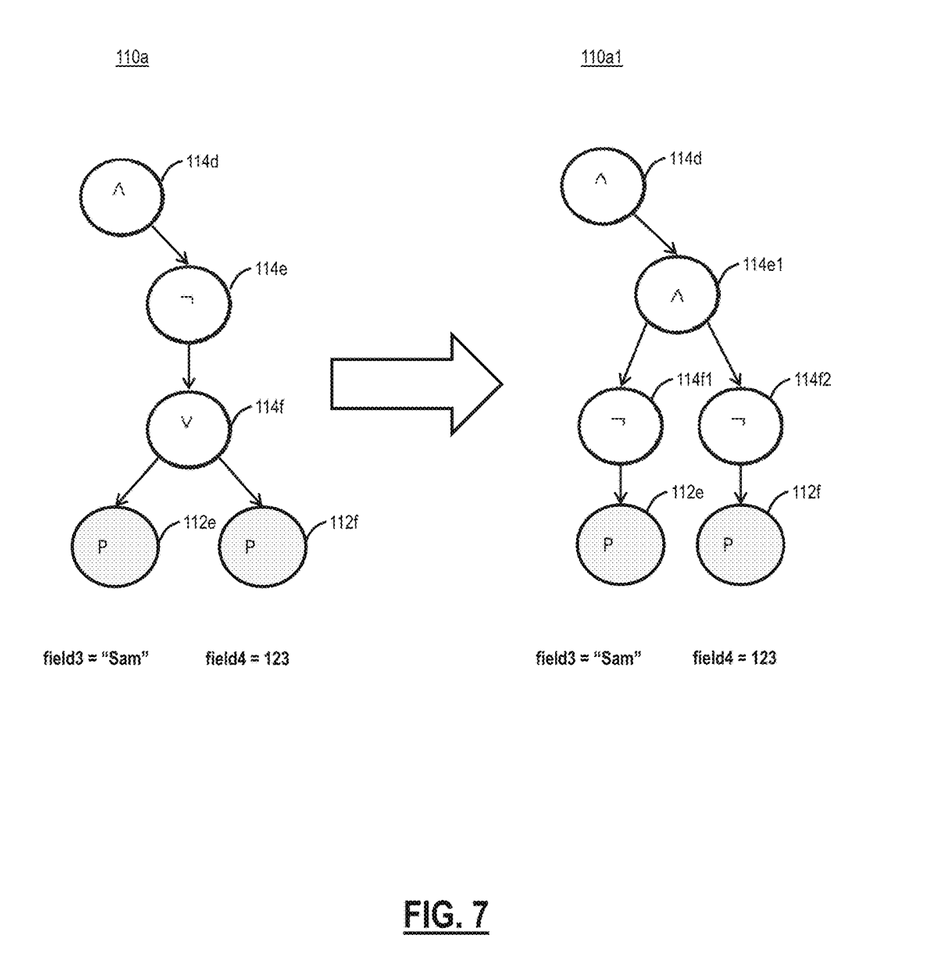
FIG. 7 is expression trees, which are subsets of the expression tree in FIG. 6, showing the expansion of a NOT expression.

This filter expression is illustrated as an expression tree 110 in FIG. 6. In the expression tree in FIG. 6, nodes 112 are the terminal nodes which represent elementary predicates. Internal nodes 114 are the non-terminal nodes which represent the logical operators AND ($\wedge$), OR ($\vee$), and/or NOT ($\neg$). The terminal nodes [field3="Sam"] and [field4=123] are an example of siblings nodes whose parent is a logical OR non-terminal node. In the foregoing description of the optimized filter expression process 100, the expression tree 110 is visually used to The optimized filter expression process 100 is used to create a minimized expression, in terms of cost, from a full filter expression. The optimized filter expression process 100 first includes expanding all "NOT" non-terminals (step 120). The first operation that is carried out on the expression tree 110 is the expansion of the NOT expression using the Boolean algebra rule $\neg(x \wedge y) = (\neg x) \vee (147\ y)$ and $\neg(x \vee y) = (\neg x) \wedge (\neg y)$. The idea here is to move the NOT nodes adjacent to the terminal nodes 112. FIG. 7 illustrates an expression tree 110a, 110a1, which are subsets of the expression tree 110, showing the expansion of a NOT expression. The expression trees 110a, 110a1 are functionally equivalent, i.e. yield the same result based on the foregoing Boolean algebra rules.

Next, the optimized filter expression process 100 includes assigning a cost to each terminal predicate expression (step 122). Each predicate requires different amount of system resources in the query processing system 10. For example, predicates containing string based conditions are cheaper than numeric based conditions. Examples of expensive conditional expressions are regex searches, substring matches, etc. The exact value that needs to be assigned to the conditional expression depends on the underlying implementation. For example, 'IN' clauses can be implemented using a hash algorithm or linear search. In the case of a hash implementation, the cost becomes lower than the linear search. In some database systems where strings are stored on a separate physical location, the cost needs to account for the time needed to fetch data from such separate location.

With respect to assigning cost when fields in the terminal node refer to different data sources, this can include Join queries with the where clause including fields from multiple data source. Note that the exclusion filter is applied at the data source level, i.e. before the join operation is carried out. The exclusion filter should only contain fields that are specific to the data source. First, the exclusion filters are generated for each data source. To obtain the exclusion filters for a given data source, an infinite cost can be assigned to any predicates that contains references to fields of any other data source.

Figure 8:
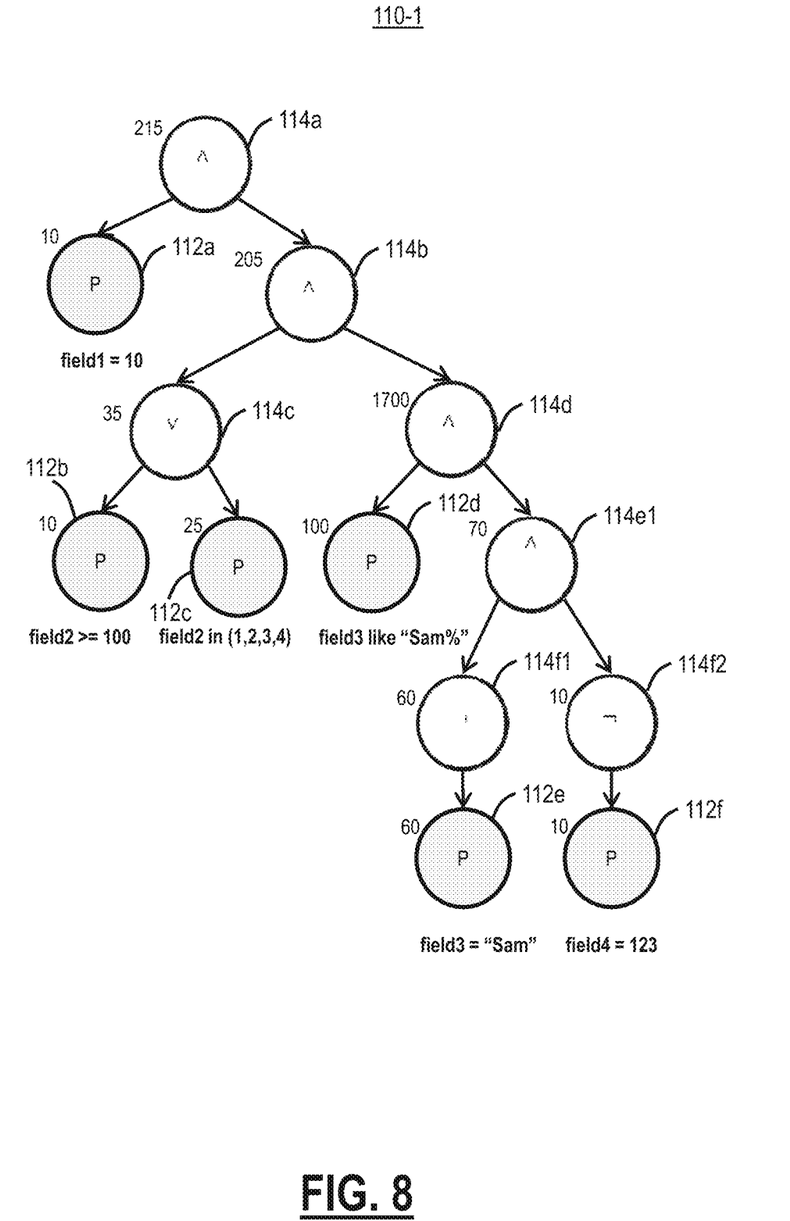
FIG. 8 is an expression tree of the full expression tree in FIG. 6 with the expansion of the NOT expression from FIG. 7 and with associated costs shown for each node.

Next, the optimized filter expression process 100 includes determining the cost of non-terminal nodes as a sum of the costs of associated child nodes (step 124). FIG. 8 is an expression tree 110-1 which is the expression tree 110 with the expansion of the NOT expression from FIG. 7. The expression tree 110-1 has the assigned costs from the steps 122, 124 of the optimized filter expression process 100. In determining the cost in FIG. 8, the costs are assigned as follows a cost of 100 to string based regex filters, a cost of 60 string equality filters, a cost of 25 for numeric "IN" filters and a cost of 10 for all other numeric filters, and with a threshold cost ($T_C$) of 60.

Figure 9A:
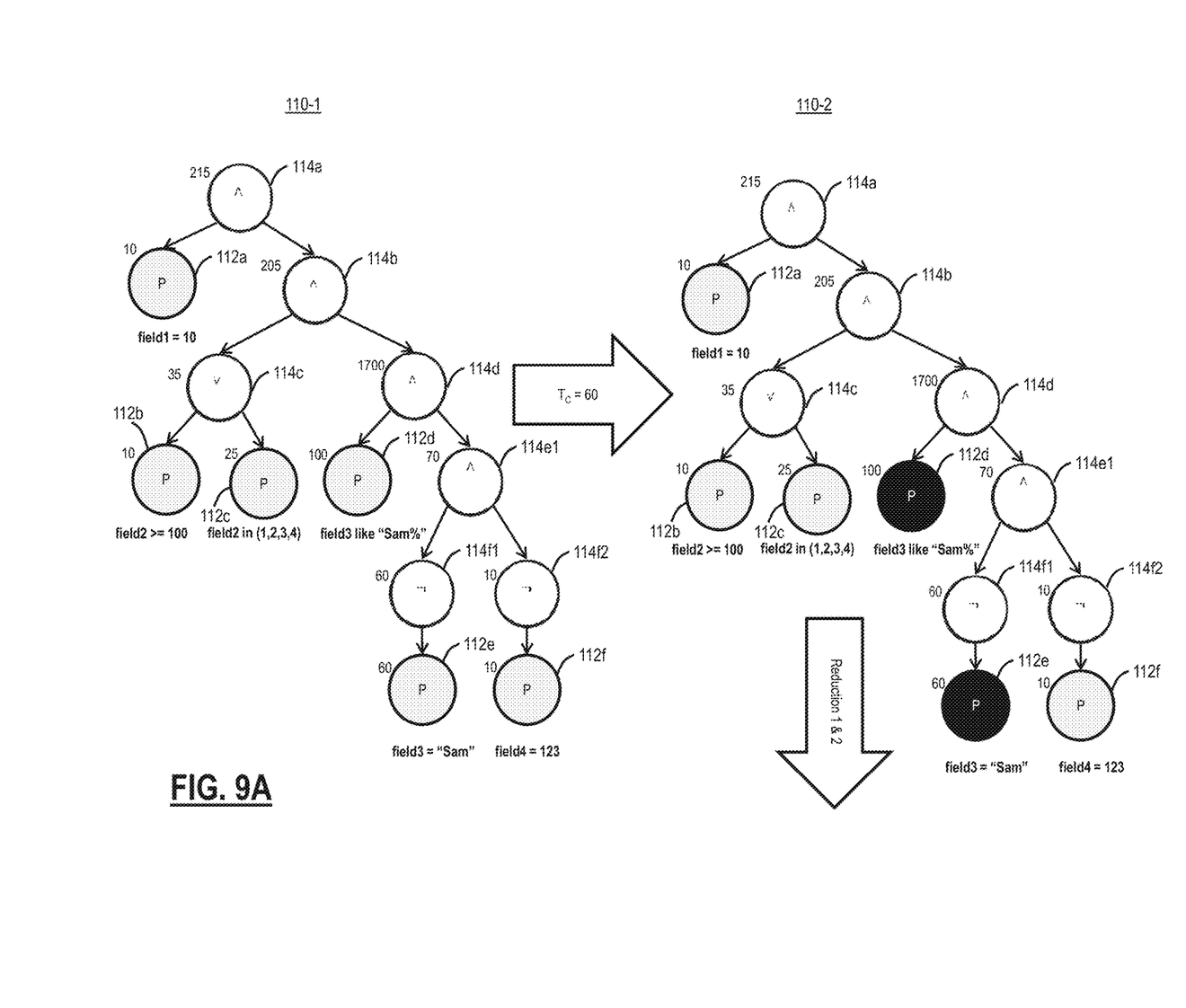
FIGS. 9A-9B are the expression tree in FIG. 8 shown with application of the reduction steps from the optimized filter expression process of FIG. 5.

The optimized filter expression process 100 includes setting all terminal nodes whose cost is greater than a threshold cost, $T_c$, equal to TRUE (1), i.e., $N_c \geq T_c$, then $N_c=1$ (step 126). Here, the threshold cost is used to remove certain terminal nodes from the optimized filter expression by setting their values to TRUE, i.e., these terminal nodes are not evaluated due to high cost in the optimized filter expression. FIG. 9A illustrates an application of the step 126 on the expression tree 110-1, to form an expression tree 110-2. Here, the terminal nodes 112d, 112e are set to TRUE (1) as their costs are greater than or equal to 60.

After the step 126 with the high cost terminal nodes set to true, the optimized filter expression process 100 includes two reduction steps. A first reduction step includes, if the parent of the node that is set to TRUE, in the step 126, is 'AND,' then substitute the parent node with the other sibling node (step 128). This first reduction removes the AND node and replaces it with the other sibling node since the node that is set to TRUE, in the step 126, has no impact on the AND node, i.e., the result of the AND node is now based solely on the other sibling node.

A second reduction step includes, if the parent of the node that is set to true, in the step 126, is 'OR' or 'NOT' then, set the parent node also as TRUE (step 130). Again, this operates similar to the first reduction, that is the second reduction removes the 'OR' or 'NOT' operation when one of the nodes is set to TRUE in the step 126.

Figure 9B:
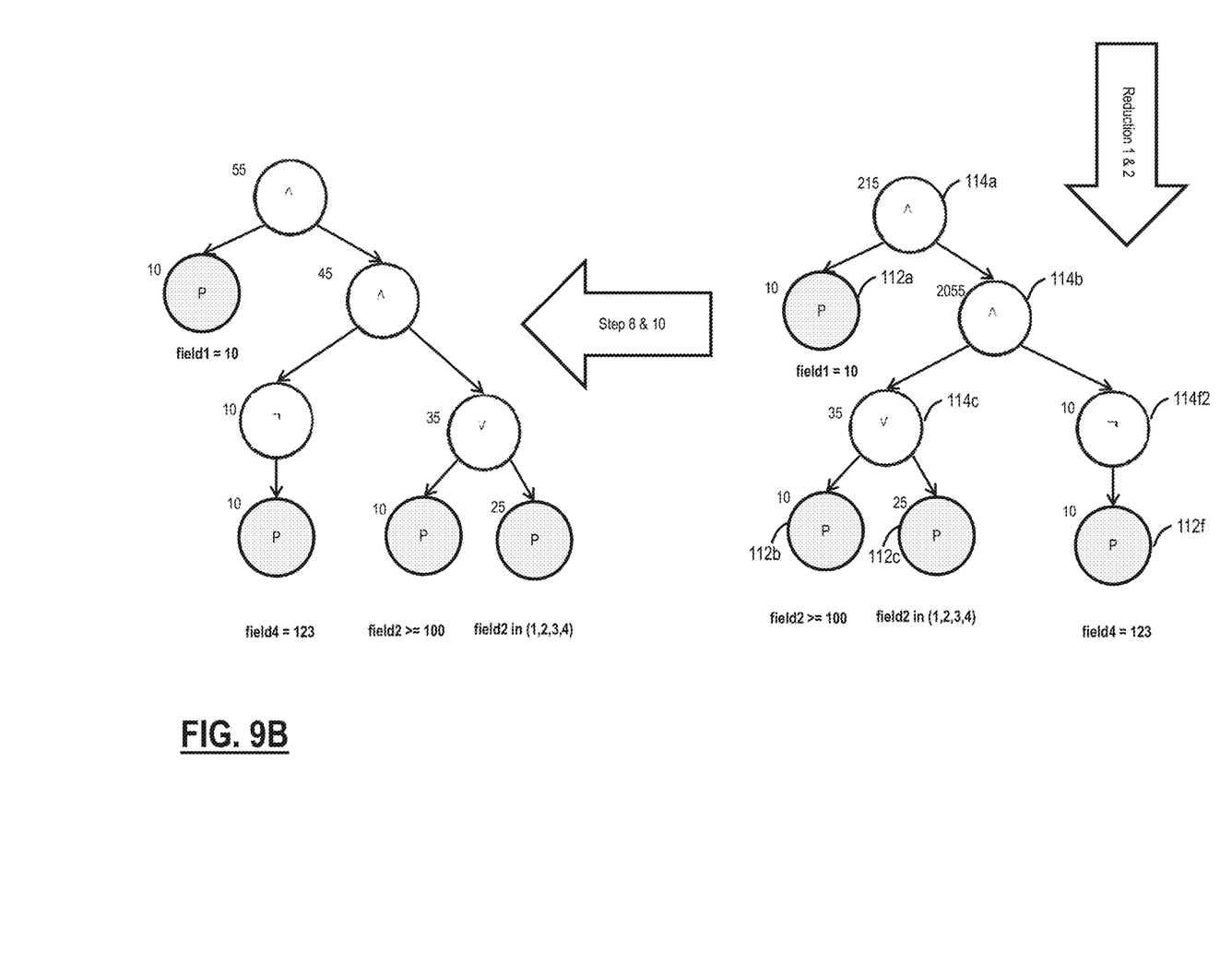

After the two reduction steps 128, 130, the optimized filter expression process 100 includes checking if the root node is TRUE (step 132), and if so, there does not exist an optimized filter expression and the optimized filter expression process 100 ends (step 134). In the expression tree 110-2, this would be whether or not the node 114a is TRUE, which it is not in the example of FIG. 9A. FIG. 9B illustrates an expression tree 110-3 which is the expression tree 110-2 after the two reduction steps 128, 130. In the expression tree 110-3, the nodes 112d, 112e, 114d, 114f1 are removed and replaced solely with the nodes 114f2, 112f.

Next, if the root node is not TRUE (step 132), the optimized filter expression process 100 includes recalculating the cost of each node after the reduction steps 128, 130 are complete (step 136). Note that this time the cost of the nodes would be different than the one calculated in the steps 122, 124, since the expression tree has been reduced or modified.

After the step 136, the optimized filter expression process 100 includes checking if the cost of the Root node is greater than $R_{tc}$ (step 138), and if so, the optimized filter expression process 100 ends (step 134), i.e. there does not exist an optimized reduction filter expression. Mathematically the limitation in the filtering capacity of the source/producer is represented by the value of the threshold $R_{tc}$. The value of this threshold is generally a multiple of $T_c$. For example if $R_{tc}=5 \times T_c$, then the source is capable of only evaluating at most 5 expensive predicates.

Next, if the cost of the Root node is not greater than $R_{tc}$ (step 138), the optimized filter expression process 100 includes, between siblings, moving lower cost nodes to the left and if the cost is the same for Non-Terminal nodes, then moving then node with 'AND' operator to the left (step 140).

At the step 138, if the cost of the Root node goes above $R_{tc}$, it is possible to re-run the optimized filter expression process 100 again, but this time by decreasing the value of $T_C$. As well as keep decreasing the value of $T_C$ until the cost of the Root node is below the desired value of $R_{tc}$. Deciding the exact value of the new $T_C$ depends on the implementation, but the general guideline is to decrease it the value of the cost represented by the next expensive predicate. For example, if the initial value of $T_C$ was the cost associated with evaluating a regex predicate and the next most expensive predicate is a substring search then the value of $T_C$ can be the cost associated with evaluating the substring search. This way each iteration would be removing more predicates from the exclusion filter expression and thus reducing the overall cost.

Filter Pipeline

Figure 10:
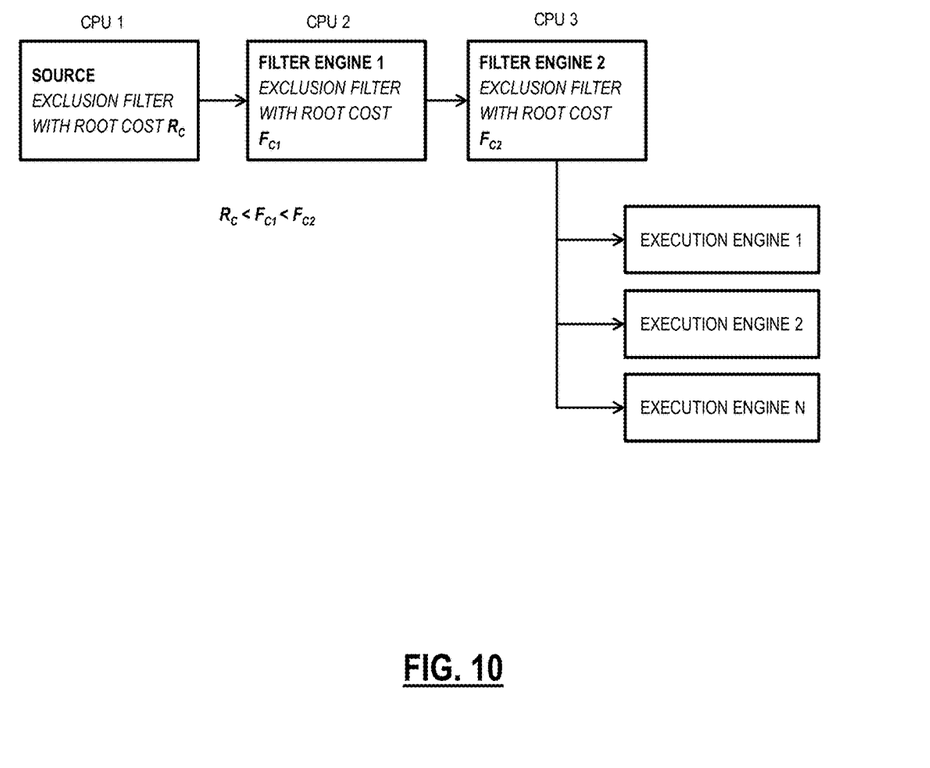
FIG. 10 is a block diagram of a filter pipeline.

Referring to FIG. 10, in an exemplary embodiment, a block diagram illustrates a filter pipeline. Another way to overcome the limitation of the filtering capacities of the source/producer is to create pipelined filter evaluation where each filtering engine runs on its own CPU. Such pipeline can be created using multiple exclusion filter expression each having different Root node cost. The source itself can evaluate the exclusion filter with the minimum cost. Note that when creating a pipeline filtering caching has to be done to avoid multiple evaluations of the same predicates twice.

Multiple Filter Expression from Multiple of Queries

When there are multiple filter expressions from multiple queries, all the filter expression need to be merged into a single filter expression. This can be achieved by joining the individual queries with a logical 'OR' operator. Subsequently, the optimized filter expression process 100 can be applied on the new expression to generate the optimized exclusion filter expression.

In case of joined queries it is always desired to apply filters first on the individual data source. It is even more important to do so if the data source for the join queries are present on separate physical partitions and minimizing read operation is desired. Often is that case that reading data from the secondary tables is more expensive then reading data from the primary tables. Take the following query as an example:

Select table1.field1, table1.field2, table1.field3, table2.field1, table2.field2 from table1, table2 where table1.field1>table1.field2 and table1.field2 in (1,2,3,4,5,6, 7) and table1.field3>=100 and table1.key1=table2.key1 and table2.field2 in (1,2,3,45)

In the example above table1 is the primary and table2 is the secondary table. In such scenarios the amount of reads on the secondary tables can be reduced by excluding unnecessary rows from the primary table in the beginning itself. So if the optimized exclusion filter expression is applied on the primary table, the desired behavior could be achieved. Furthermore the optimized exclusion filter expression can be applied on each join data source independently. To generate an optimized exclusion filter expression for each data source in the join operation, the costs can be adjusted as described herein.

For the above example query, the exclusion filter set for the primary table (table1) would contain table1.field1>table1.field2 and table1.field2 in (1,2,3,4,5, 6,7) and table1.field3>=100.

And the exclusion filter set for the secondary table (table2) would contain table2.field2 in (1,2,3,4,5).

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for querying a data source using an optimized exclusion filter expression created from reducing a full filter expression for optimization thereof, the method comprising:
   receiving one or more queries defined by the full filter expression, wherein the one or more queries are for obtaining an output from the data source;
   performing a reduction on the full filter expression to determine the optimized exclusion filter expression, wherein the full filter expression and the optimized exclusion filter expression are each a combination of predicates and logical operators comprising AND, OR, and NOT, and wherein the reduction comprises utilizing an expression tree for the full filter expression, expanding NOT expressions in the expression tree, assigning costs to each terminal node in the expression tree, setting high cost terminal nodes to TRUE, and adjusting the expression tree based thereon;
   applying the optimized exclusion filter expression to a first set of data in the data source to exclude data and provide a reduced set of data, wherein if a result of the optimized exclusion filter expression is FALSE then the full filter expression also yields a result of FALSE thereby allowing exclusion of the data and wherein if the result of the optimized exclusion filter expression is TRUE then the full filter expression does not have a definitive result and must be evaluated thereby requiring inclusion of the data in the reduced set of data; and
   applying the full filter expression to the reduced set of data.

2. The computer-implemented method of claim 1, wherein the one or more queries comprise two separate queries that are combined in a same optimized exclusion filter expression for the applying the optimized exclusion filter, and evaluated separately for the applying the full filter expression.

3. The computer-implemented method of claim 1, wherein the data source comprises a plurality of physically separate databases, and the optimized exclusion filter expression is determined for each individual separate database.

4. The computer-implemented method of claim 1, wherein the reduction is performed iteratively by reducing threshold costs to remove more predicates and reduce the overall cost, to determine a minimization of the optimized exclusion filter expression.

5. The computer-implemented method of claim 1, wherein the associated expression tree is adjusted by modifying nodes where the high cost predicates are set to TRUE.

6. A system configured to query a data source using an optimized exclusion filter expression created from reducing a full filter expression for optimization thereof, the system comprising:
   a network interface, the data store, and a processor, each communicatively coupled to one another; and
   memory storing instructions that, when executed, cause the processor to:
     receive one or more queries defined by the full filter expression, wherein the one or more queries are for obtaining an output from the data source;
     perform a reduction on the full filter expression to determine the optimized exclusion filter expression, wherein the full filter expression and the optimized exclusion filter expression are each a combination of predicates and logical operators comprising AND, OR, and NOT, and wherein the reduction comprises utilizing an expression tree for the full filter expression, expanding NOT expressions in the expression tree, assigning costs to each terminal node in the expression tree, setting high cost terminal nodes to TRUE, and adjusting the expression tree based thereon;
     apply the optimized exclusion filter expression to a first set of data in the data source to exclude data and provide a reduced set of data, wherein if a result of the optimized exclusion filter expression is FALSE then the full filter expression also yields a result of FALSE thereby allowing exclusion of the data and wherein if the result of the optimized exclusion filter expression is TRUE then the full filter expression does not have a definitive result and must be evaluated thereby requiring inclusion of the data in the reduced set of data; and
     apply the full filter expression to the reduced set of data.

7. The system of claim 6, wherein the one or more queries comprise two separate queries that are combined in a same optimized exclusion filter expression to apply the optimized exclusion filter, and evaluated separately to apply the full filter expression.

8. The system of claim 6, wherein the data source comprises a plurality of physically separate databases, and the optimized exclusion filter expression is determined for each individual separate database.

9. The system of claim 6, wherein the reduction is performed iteratively by reducing threshold costs to remove more predicates and reduce the overall cost, to determine a minimization of the optimized exclusion filter expression.

10. The system of claim 6, wherein the associated expression tree is adjusted by modifying nodes where the high cost predicates are set to TRUE.

11. Software stored in a non-transitory computer readable medium and comprising instructions executable by a processor, and in response to such execution causes the processor to perform operations comprising:
receiving one or more queries defined by the full filter expression, wherein the one or more queries are for obtaining an output from the data source;
performing a reduction on the full filter expression to determine an optimized exclusion filter expression which is an optimized version of the full filter expression, wherein the full filter expression and the optimized exclusion filter expression are each a combination of predicates and logical operators comprising AND, OR, and NOT, and wherein the reduction comprises utilizing an expression tree for the full filter expression, expanding NOT expressions in the expression tree, assigning costs to each terminal node in the expression tree, setting high cost terminal nodes to TRUE, and adjusting the expression tree based thereon;
applying the optimized exclusion filter expression to a first set of data in the data source to exclude data and provide a reduced set of data, wherein if a result of the optimized exclusion filter expression is FALSE then the full filter expression also yields a result of FALSE thereby allowing exclusion of the data and wherein if the result of the optimized exclusion filter expression is TRUE then the full filter expression does not have a definitive result and must be evaluated thereby requiring inclusion of the data in the reduced set of data; and
applying the full filter expression to the reduced set of data.

12. The software stored in a non-transitory computer readable medium of claim 11, wherein the one or more queries comprise two separate queries that are combined in a same optimized exclusion filter expression for the applying the optimized exclusion filter, and evaluated separately for the applying the full filter expression.

* * * * *